_(12)_ United States Patent
Lee et al.

(10) Patent No.: US 9,228,639 B2
(45) Date of Patent: Jan. 5, 2016

(54) AUTOMATED MANUAL TRANSMISSION

(71) Applicant: Hyundai Motor Company, Seoul (KR)

(72) Inventors: Min Wook Lee, Gwangju (KR); Jong Yun Park, Hwaseong-si (KR); Soon Ki Eo, Ansan-si (KR); Han Ki Hong, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/096,715

(22) Filed: Dec. 4, 2013

(65) Prior Publication Data

US 2015/0045172 A1    Feb. 12, 2015

(30) Foreign Application Priority Data

Aug. 12, 2013 (KR) .......................... 10-2013-0095241

(51) Int. Cl.
*F16H 48/06* (2006.01)
*F16H 3/44* (2006.01)

(52) U.S. Cl.
CPC .......................................... *F16H 3/44* (2013.01)

(58) Field of Classification Search
CPC ........................................................ F16H 3/44

USPC .................. 475/5, 207, 8, 221, 317, 323, 302
See application file for complete search history.

(56) References Cited

U.S. PATENT DOCUMENTS

| 8,622,863 | B2 * | 1/2014 | Kurokawa ......................... 475/5 |
| 8,663,057 | B2 * | 3/2014 | Eo et al. ....................... 475/302 |
| 8,684,875 | B2 * | 4/2014 | Kaltenbach et al. .............. 475/5 |
| 8,777,789 | B2 * | 7/2014 | Potter .............................. 475/5 |

FOREIGN PATENT DOCUMENTS

| JP | 58-109750 A | 6/1983 |
| JP | 2009-250276 A | 10/2009 |
| KR | 10-2007-0115023 A | 12/2007 |
| KR | 10-0951967 B1 | 12/2009 |
| KR | 10-2010-0057673 A | 5/2010 |

\* cited by examiner

*Primary Examiner* — David J Hlavka
(74) *Attorney, Agent, or Firm* — Morgan, Lewis & Bockius LLP

(57) ABSTRACT

An automated manual transmission includes an input, an output disposed in parallel with the input, a common use planetary gear device disposed on the input or the output, a shift gear device in which a plurality of external gear mates having different shift ratios are disposed on the input and the output, and a friction member disposed to transmit the rotation power transmitted to the input at the time of the braking to the output through the external gear mates.

11 Claims, 5 Drawing Sheets

AUTOMATED MANUAL TRANSMISSION

CROSS REFERENCE TO RELATED APPLICATION

The present application claims priority of Korean Patent Application Number 10-2013-0095241 filed Aug. 12, 2013, the entire contents of which application are incorporated herein for all purposes by this reference.

BACKGROUND OF INVENTION

1. Field of Invention

The present invention relates to an automated manual transmission, and more particularly, to an automated manual transmission capable of improving a shift quality deterioration phenomenon that a vehicle is likely to be pulled back during a shift operation of the automated manual transmission and reducing a full length and a weight of the transmission by sharing a planetary gear device which is used for synchronization during the shift operation.

2. Description of Related Art

An automated manual transmission is automatically shifted by an actuator during a driving of a vehicle to be able to provide driving convenience like that of an automatic transmission and transmits power more efficiently than the automatic transmission to be able to contribute to improvement of fuel efficiency of a vehicle.

However, in case of the automated manual transmission based on a synchromesh type shift mechanism, it cannot avoid an instant that an engine does not transmit power even during the automatic shifting of a gear by the actuator and thus a torque is reduced, such that a shift quality deterioration phenomenon that a vehicle is likely to be pulled back may be caused.

To solve the above problem, a technology of installing a plurality of planetary gear devices between an engine and a shift mechanism to selectively transmit the power of an engine to the shift mechanism or an output depending on a driving state of a vehicle has been proposed.

Figure 1:
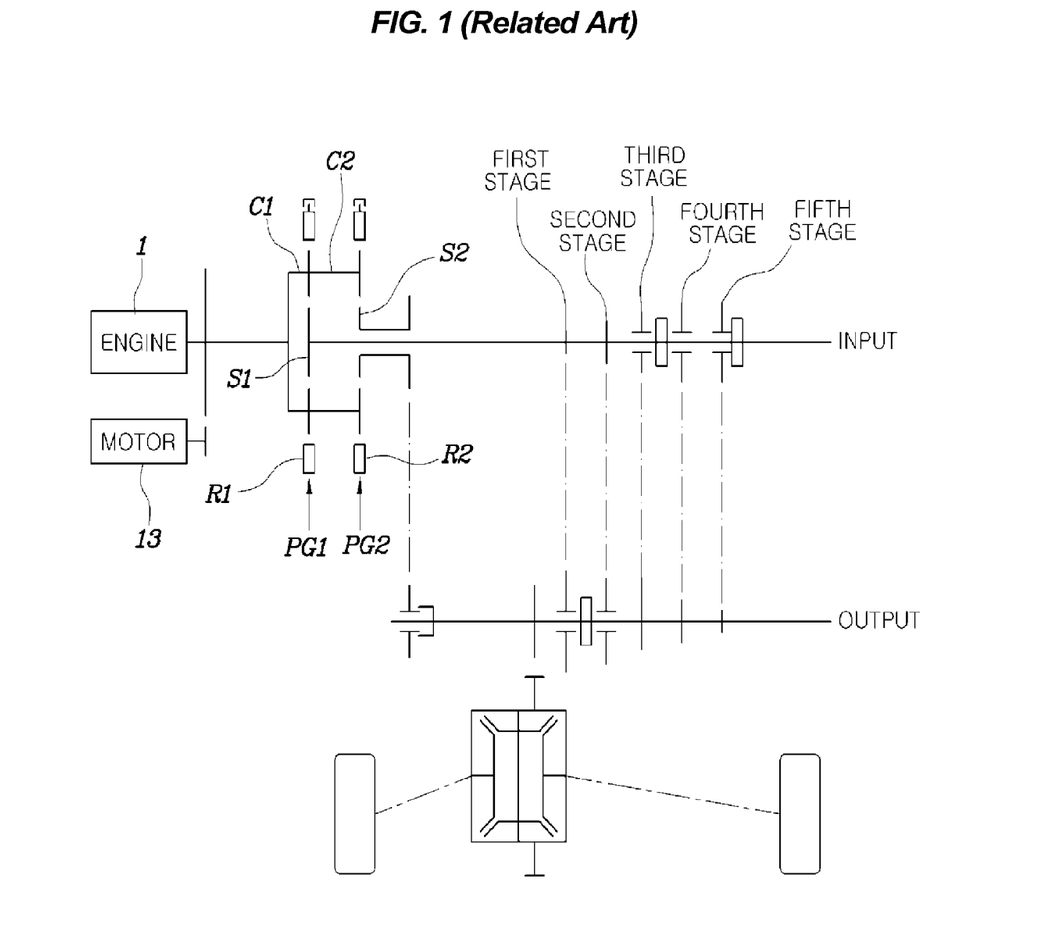
FIG. 1 is a schematic diagram illustrating a structure of a transmission in a state in which a single pinion planetary gear device is mounted along with a manual shift mechanism, in a structure of an automated manual transmission according to the related art.

Referring to FIG. 1, a power of an engine 1 is transmitted to a shift mechanism through an input by a first planetary gear device PG1 during driving and the power of the engine 1 is transmitted to an output by a second planetary gear device PG2 during shifting, thereby improving a shift quality due to the reduction in torque during the shifting. In this case, ring gears R1 and R2 installed in the first planetary gear device PG1 or the second planetary gear device PG2 during the driving or the shifting are selectively limited and thus sun gears S1 and S2 selectively rotate by rotation of carriers C1 and C2.

However, the above-mentioned related art uses a synchronizer based on a type of synchronizing and meshing a shift stage suitable for a driving speed during all the shift operations to implement each shift stage and thus the shift operation may be slow. Meanwhile, as the related art, Korean Patent Laid-Open Publication No. 10-2009-0132758 entitled "Power train for a hybrid electric vehicle with automated manual transmission" has been disclosed.

However, according to the above-mentioned method, two motors are separately mounted and thus the costs and weight may largely increase.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide an automated manual transmission capable of improving a shift quality deterioration phenomenon that a vehicle is likely to be pulled back during a shift operation of the automated manual transmission and reducing a full length and a weight of the transmission by sharing a planetary gear device which is used for synchronization during the shift operation.

According to various aspects of the present invention, there is provided an automated manual transmission, including: an input configured to rotate by being supplied with a rotation power from an engine; an output disposed in parallel with the input; a common use planetary gear device disposed on the input or the output and to be rotatably provided with three rotation elements, in which one rotation element is connected to the input or the output; a shift gear device in which a plurality of external gear mates having different shift ratios are disposed on the input and the output in a meshed state at all times, wherein each of external gears is relatively rotatably disposed with respect to the input or the output among the plurality of external gear mates, and one or more external gears are connected to share another rotation element of the common use planetary gear device; and a friction member disposed to brake the remaining rotation element of the common use planetary gear device to transmit the rotation power transmitted to the input at the time of the braking to the output through the external gear mates.

The automated manual transmission may further include: a dedicated planetary gear device disposed on the input or the output and to be rotatably provided with three rotation elements, in which one rotation element is connected to the input or the output, wherein in the shift gear device, the external gear mates may be disposed on the input and the output in the meshed state at all times and an external gear relatively rotatably disposed with respect to the input or the output among the external gear mates is connected to one of the remaining rotation elements of the dedicated planetary gear device.

The common use planetary gear device may be disposed between the plurality of external gear mates having different shift ratios. In the dedicated planetary gear device and the common use planetary gear device, the rotation element connected to the input may be a sun gear, the rotation element connected to the external gear may be a carrier, and the rotation element which is braked by the friction member may be a ring gear.

The dedicated planetary gear device and the common use planetary gear device may be a single pinion planetary gear device, respectively. The dedicated planetary gear device and the common use planetary gear device may be connected to the external gear mates implementing a deceleration shift ratio.

In the common use planetary gear device, the external gear may be a first stage input external gear and a third stage input external gear which are connected to share a carrier of the common use planetary gear device, and in the dedicated planetary gear device, the external gear connected to a carrier of the dedicated planetary gear device may be a second stage input external gear.

The automated manual transmission may further include a shift mechanism selecting an external gear mate implementing the shift ratio by a linear displacement on the input or the output to transmit the rotation power transmitted from the input to the output.

The automated manual transmission may further include a clutch configured to selectively connect or disconnect the rotation power of the engine to or from the input, wherein the shift mechanism selecting the external gear mate implementing a 1:1 shift ratio or an acceleration shift ratio by the linear displacement on the input or the output to transmit the rotation power transmitted from the input to the output.

The automated manual transmission may further include: a reverse driving gear and a reverse driven gear each disposed on the input or the output; a reverse idler shaft disposed in parallel with the input or the output; a reverse idler gear rotatably disposed on the reverse idler shaft and in the meshed state with the reverse driving gear and the reverse driven gear; and a reverse shift mechanism disposed to convert a state of connecting the reverse idler gear to the reverse idler shaft and a state of disconnecting the reverse idler gear from the reverse idler shaft by a linear displacement on the reverse idler shaft.

According to various other aspects of the present invention, there is provided an automated manual transmission, including: an input rotatably configured by being supplied with a rotation power from an engine; an output disposed in parallel with the input; a shift gear device in which an external gear mate is disposed on the input and the output in a meshed state at all times; a plurality of planetary gear devices disposed on the input or the output for producing different shift ratios and each rotatably provided with three rotation elements, one rotation element in each planetary gear device being connected to the input or the output and another rotation element in each planetary gear device being connected to an external gear or gears in the external gear mate, wherein the external gears are relatively rotatably disposed with respect to the input or the output; and a friction member disposed to brake an remaining rotation element or elements of the plurality of planetary gear devices to transmit the rotation power transmitted to the input at the time of the braking to the output through the external gear mate.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
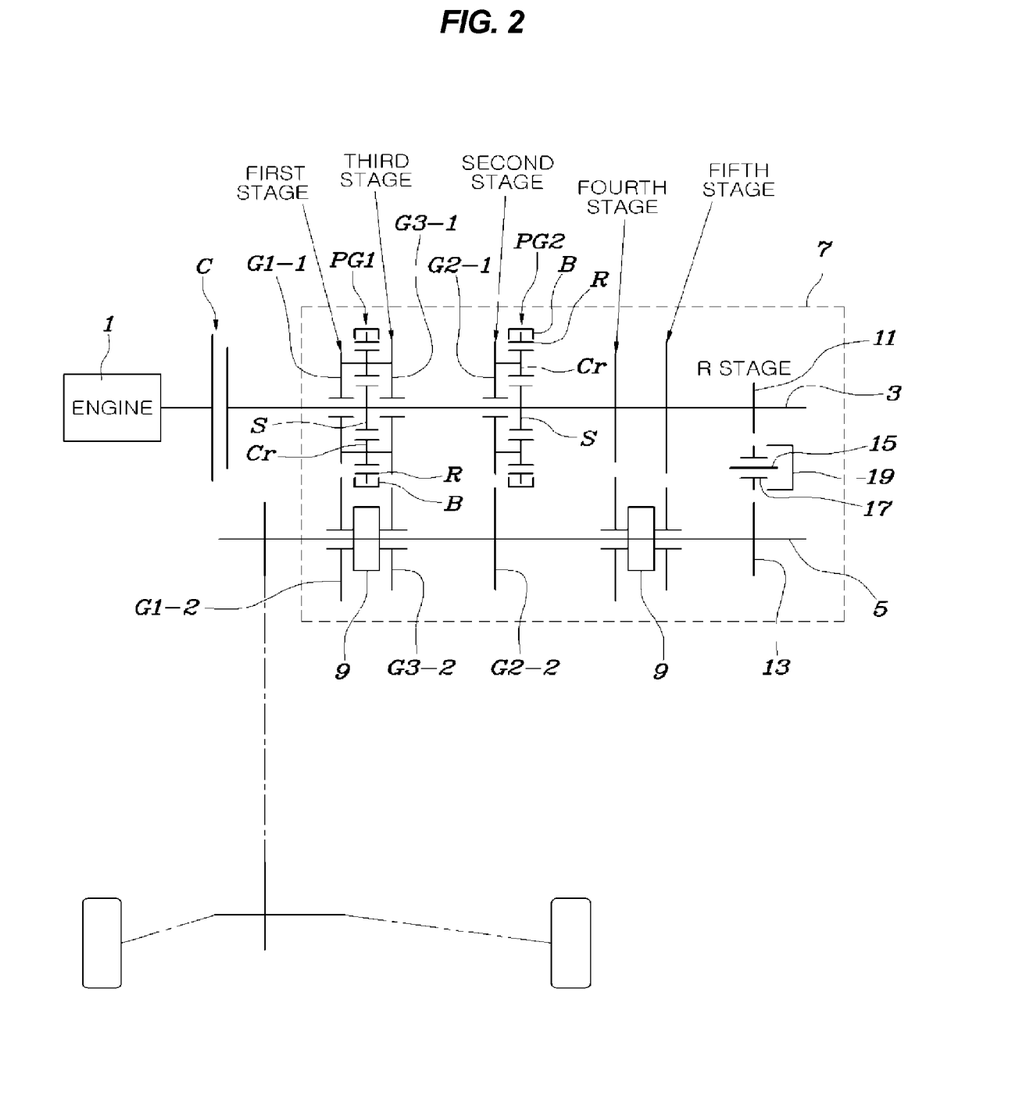
FIG. 2 is a schematic diagram illustrating a structure of an exemplary automated manual transmission according to the present invention.
Figure 3:
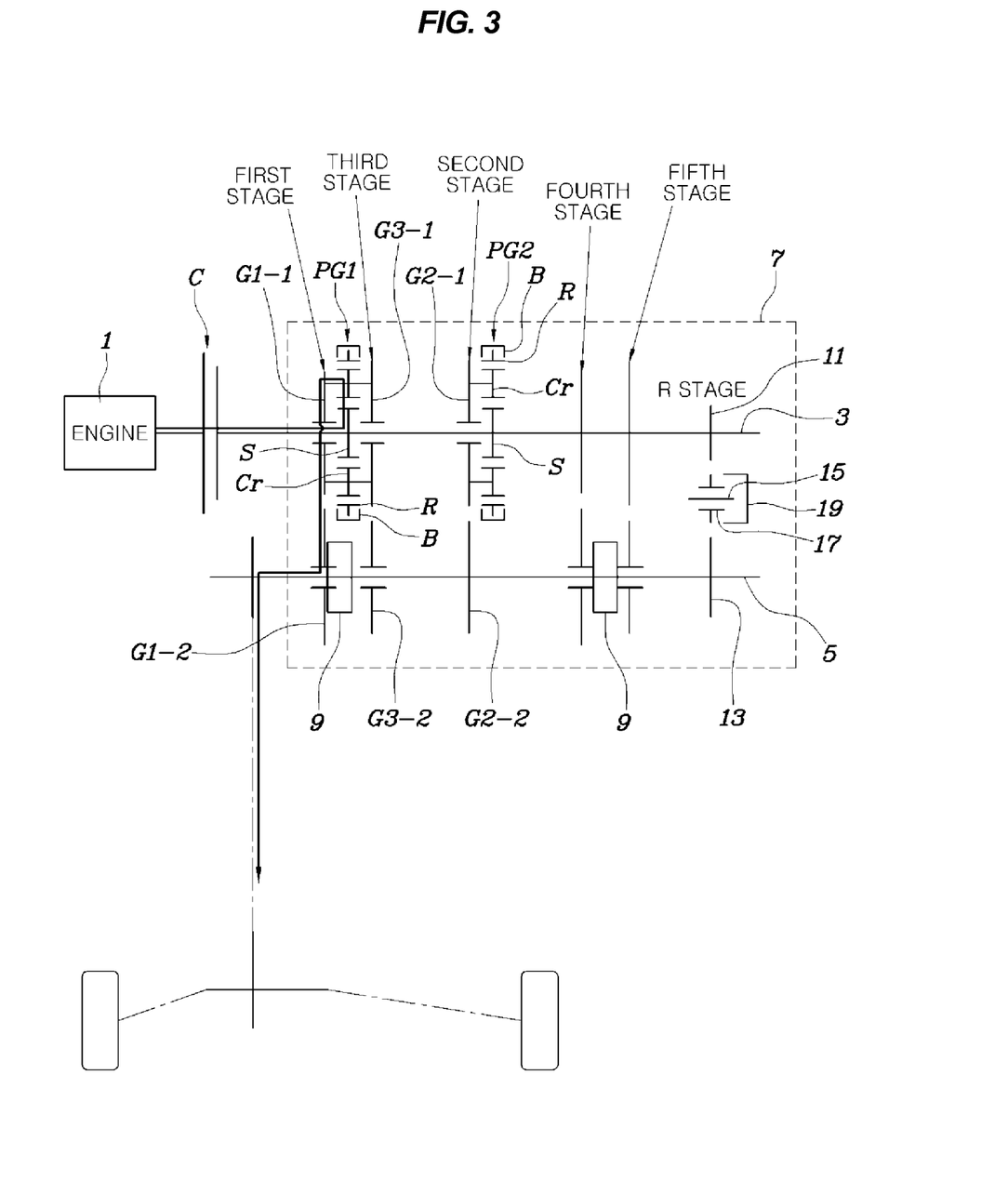
FIG. 3 is a schematic diagram describing a power transmission path at the time of first stage driving, in a structure of an exemplary automated manual transmission according to the present invention.
Figure 4:
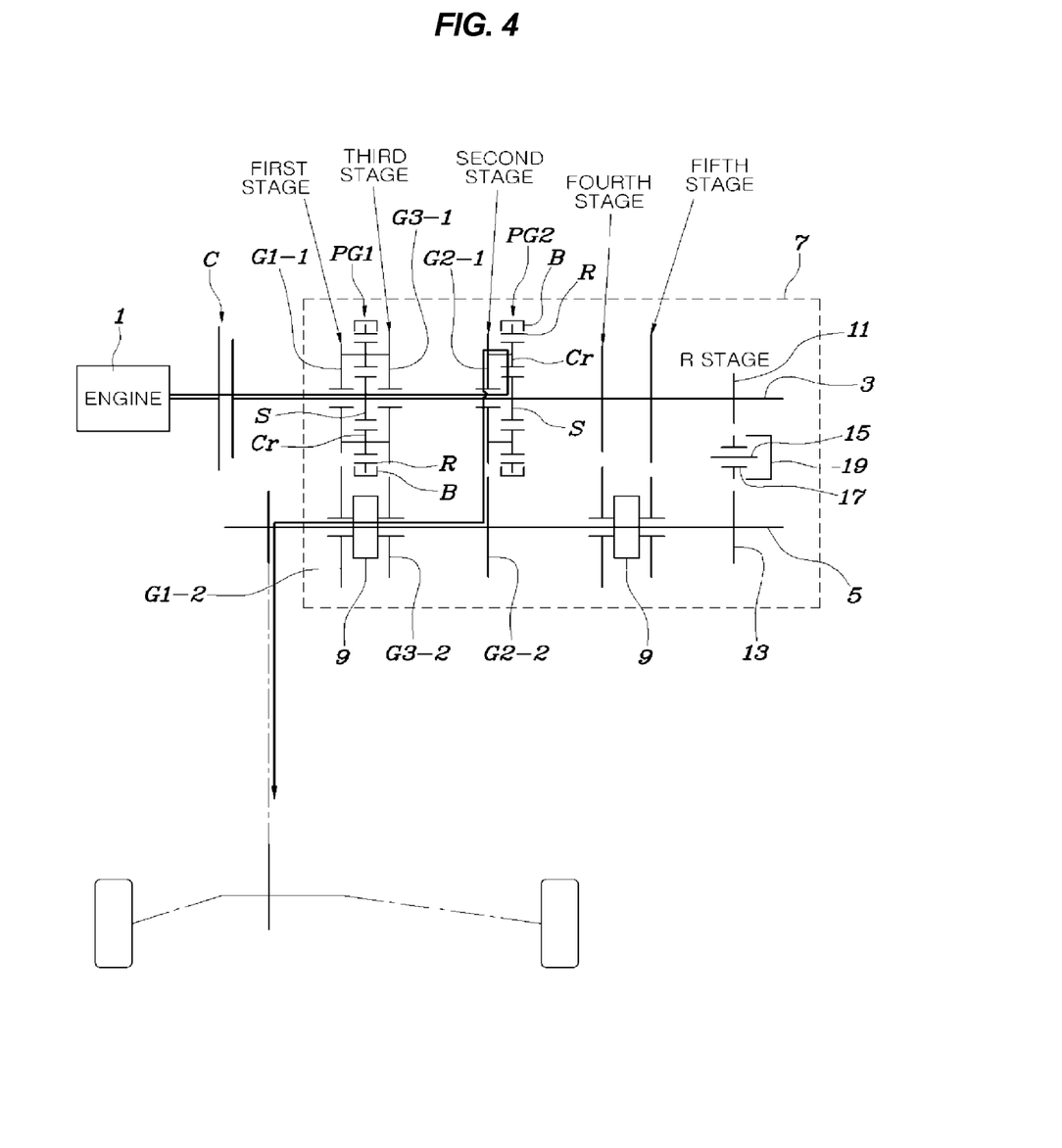
FIG. 4 is a schematic diagram describing a power transmission path at the time of second stage driving, in a structure of an exemplary automated manual transmission according to the present invention.
Figure 5:
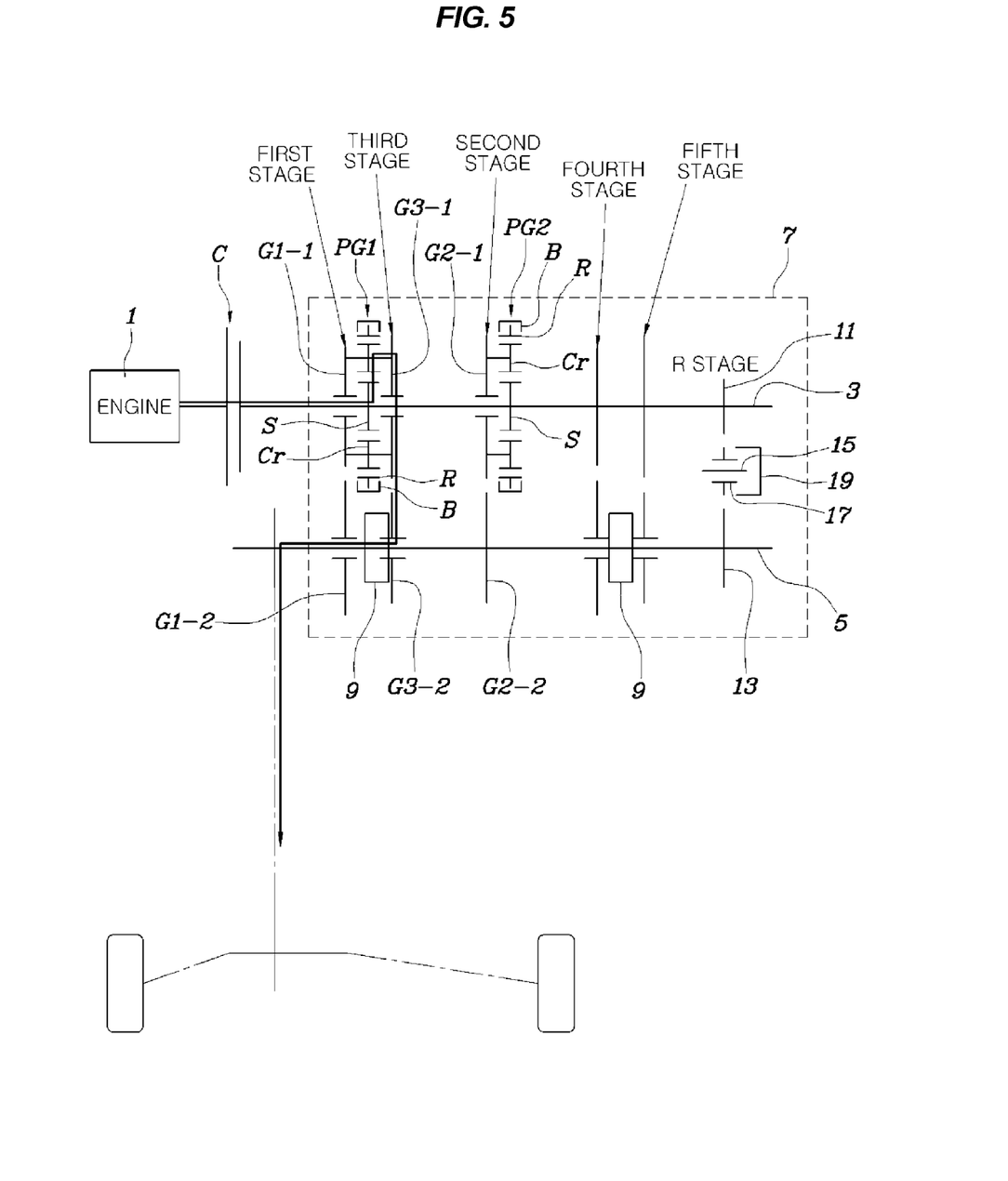
FIG. 5 is a schematic diagram describing a power transmission path at the time of third stage driving, in a structure of an exemplary automated manual transmission according to the present invention.

FIG. 2 is a schematic diagram illustrating a structure of an automated manual transmission, FIG. 3 is a schematic diagram describing a power transmission path at the time of first stage driving in the structure of the automated manual transmission, FIG. 4 is a schematic diagram describing a power transmission path at the time of second stage driving in the structure of the automated manual transmission, and FIG. 5 is a schematic diagram describing a power transmission path at the time of third stage driving in the structure of the automated manual transmission according to various embodiments of the present invention.

The automated manual transmission according to various embodiments of the present invention is configured to include an input 3, an output 5, a common use planetary gear device PG1, a shift gear device or shift stage gear device 7, and a friction member B.

Describing in detail an exemplary embodiment of the present invention with reference to FIG. 2, the input 3 is configured to rotate by being supplied with a rotation power from the engine 1, the output 5 is disposed in parallel or substantially in parallel with the input 3, the common use planetary gear device PG1 is disposed on the input 3 or the output 5 and rotatably provided with three rotation elements, in which one rotation element is connected to the input 3 or the output 5, the shift gear device 7 in which the plurality of external gear mates having different shift ratios are disposed on the input 3 and the output 5 in the meshed state at all times and each of the external gears, which is relatively rotatably disposed with respect to the input 3 or the output 5 among the plurality of external gear mates, is connected to share one of the remaining rotation elements of the common use planetary gear device PG1, and the friction member B is disposed to brake other rotation elements among the remaining rotation elements of the common use planetary gear device PG1 so as to transmit the rotation power transmitted to the input 3 at the time of the braking to the output 5 through the external gear mate.

That is, the power of the engine 1 transmitted to the input 3 is transmitted to the output 5 by using planetary gear devices PG1 to PG2, or in some cases with one or more or a plurality of planetary gear devices, instead of using a synchronizer which is used for shifting in the existing manual shift mechanism to largely reduce a shift time and prevent a torque reduction phenomenon occurring during shifting so as to improve a shift quality. In particular, two pairs of external gear mates having different shift ratios share the one planetary gear device to reduce the number of planetary gear devices which is used to generate power transmission paths having different shift ratios, thereby reducing a full length and a weight of the transmission.

According to various embodiment of the present invention, the automated manual transmission may be configured to further include a dedicated planetary gear device PG2 which is disposed on the input 3 or the output 5 and rotatably provided with three rotation elements, in which one rotation element is connected to the input 3 or the output 5. In this case, in the shift gear device 7, the external gear mate is disposed on the input 3 and the output 5 in a meshed state at all times and the external gear, which is relatively rotatably disposed with respect to the input 3 or the output 5, among the external gear mates may be connected to one of the remaining rotation elements of the dedicated planetary gear device PG2.

Herein, the common use planetary gear device PG1 may be disposed between the plurality of external gear mates having different shift ratios. The common use planetary gear device PG1 may be jointly connected between the two pairs of external gear mates to implement a 1-speed and 3-speed shift ratio and the dedicated planetary gear device PG2 may be connected to the external gear mate to implement a 2-speed shift ratio.

In detail, the common use planetary gear device PG1 is connected between a first stage input external gear G1-1 and a third stage input external gear G3-1 and the dedicated planetary gear device PG2 is connected to a second stage input external gear G2-1. Further, in the dedicated planetary gear device PG2 and the common use planetary gear device PG1 according to various embodiment of the present invention, the rotation element connected to the input 3 is a sun gear S, the rotation element connected to the external gear is a carrier Cr, and the rotation element which may be braked by the friction member B may be a ring gear R.

That is, in the common use planetary gear device PG1 for the 1-speed and 3-speed shifting, the sun gear S may be connected to the input 3, the carrier Cr may be connected to the first stage input external gear G1-1 and the third stage input external gear G3-1, respectively, and the ring gear R may be connected thereto to be braked by the friction member B.

Further, in the dedicated planetary gear device PG2 for the 2-speed shifting, the sun gear S may be connected to the input 3, the carrier Cr may be connected to the second stage input external gear G2-1, and the ring gear R may be connected thereto to be braked by the friction member B.

Meanwhile, according to various embodiment of the present invention, the dedicated planetary gear device PG2 and the common use planetary gear device PG1 may be configured as a single pinion planetary gear device. Further, the dedicated planetary gear device PG2 and the common use planetary gear device PG1 may be connected to the external gear mates to implement a deceleration shift ratio.

That is, the plurality of external gear mates are provided in the shift gear device 7 to implement several shift stages, but since the reduction in the shift quality is specially remarkable due to the reduction in torque during the shifting in a low-speed stage rather than in a high-speed stage, the external gear mates for implementing the deceleration shift ratio may be mounted at the external gear mates. Various embodiments of the present invention describe and illustrate that the common use planetary gear device PG1 and the dedicated planetary gear device PG2 are mounted at the external gear mates for implementing the 1-speed to 3-speed shift stage, which may vary depending on the shift ratio of the external gear.

In the common use planetary gear device PG1 according to various embodiment of the present invention, the external gears connected to share the carrier Cr may be the first stage input external gear G1-1 and the third stage input external gear G3-1 and in the dedicated planetary gear device PG2, the external gear connected to the carrier Cr may be the second stage input external gear G2-1.

That is, at the time of being up-shifted from 1 speed to 2 speed, the 2-speed shift stage is implemented by connecting the dedicated planetary gear device to the second stage input external gear G2-1 simultaneously with disconnecting between the common use planetary gear device PG1 and the first stage input external gear G1-1 in the state in which the common use planetary gear device PG1 is connected to the first stage input external gear G1-1 to implement the 1-speed shift stage. Further, even in the case of being up-shifted from 2 speed to 3 speed or down-shifted at 3 speed, the corresponding shift stage may be implemented by the connection and disconnection operations of the planetary gear device.

Therefore, since the connection and disconnection operations of the common use planetary gear device PG1 and the dedicated planetary gear device PG2 are almost simultaneously performed during the shift operation using the planetary gear device and the shifting is performed even when a disconnection of a clutch C is not performed, the shifting is rapidly performed, such that the shift time may be shortened and the shift shock occurring during the shift operation may be reduced.

The automated manual transmission according to various embodiment of the present invention may be configured to further include a shift mechanism 9 which selects the external gear mates implementing a shift ratio by a linear displacement on the input 3 or the output 5 to transmit the rotation power transmitted from the input 3 to the output 5.

That is, the shift mechanism 9 may be a synchronizer which is selectively synchronized and meshed with a first stage output external gear G1-2 or a third stage output external gear G3-2 by the linear displacement between the first stage output external gear G1-2 or the third stage output external gear G3-2 and may be configured to connect the corresponding output external gear to the output 5 only at the time of implementing the 1-speed and 3-speed shift stage.

The automated manual transmission according to various embodiment of the present invention may be configured to further include the clutch C which is configured to selectively connect or disconnect the rotation power of the engine 1 to or from the input 3 and the shift mechanism 9 which selects the external gear mate implementing a 1:1 shift ratio or an acceleration shift ratio by the linear displacement on the input 3 or the output 5 to transmit the rotation power transmitted from the input 3 to the output 5.

That is, the shift mechanism 9 may be a synchronizer which is synchronized and meshed with the external gear. By doing so, when the shift operation is performed at the shift stage of a middle and high speed or more using the planetary gear device, the high-speed stage has a relatively long driving time, when an oil pressure is continuously applied, the fuel efficiency may be reduced, and since the problem occurrence of the shift quality is relatively small at the time of shifting at a high speed, the shifting may be performed at the high-speed shift stage of the 1:1 shift ratio or more by the shift mechanism 9.

The automated manual transmission may be configured to further include: a reverse driving gear 11 and a reverse driven gear 13 which are disposed on the input 3 or the output 5, a reverse idler shaft 15 which is disposed in parallel or substantially in parallel with the input 3 or the output 5, a reverse idler gear 17 which is rotatably disposed at the reverse idler shaft 15 and is disposed in the meshed state with the reverse driving gear 11 and the reverse driven gear 13, and a reverse shift mechanism 19 which is disposed to convert the state in which the reverse idler gear 17 is connected to the reverse idler shaft 15 and the state in which the reverse idler gear 17 is disconnected from the reverse idler shaft 15, by the linear displacement on the reverse idler shaft 15.

Meanwhile, the automated manual transmission according to the embodiment of the present invention is configured to include: the input 3 which is configured to rotate by being supplied with the rotation power from the engine 1; the output 5 which is disposed in parallel or substantially in parallel with the input 3, the shift stage gear device 7 in which the external gear mate is provided at the input 3 and the output 5 in the meshed state at all time; the plurality of planetary gear devices which are disposed on the input 3 or the output 5 by making the shift ratio different and each are rotatably provided with three rotation elements, in which each of the rotation element is connected to the input 3 or the output 5 and one of the remaining rotation elements is connected to the external gear which is relatively rotatably disposed to the input 3 or the output 5 among the external gear mates; and the friction member B which is provided to brake other rotation elements among the remaining rotation elements of the plurality of planetary gear devices to transmit the rotation power transmitted to the input 3 at the time of braking to the output 5 through the external gear mate.

That is, for example, the planetary gear device is connected to each of the external gear mates implementing the deceleration shift ratio to perform the shifting, instead of the synchronizer. Therefore, since the connection and disconnection operations of the planetary gear devices are simultaneously performed and the operation of the clutch C is unnecessary, the shifting may be rapidly performed and the clutch C may be removed, thereby reducing the weight and costs of the transmission.

Meanwhile, FIG. 3 is a schematic diagram describing a power transmission path at the time of one stage driving in the structure of the automated manual transmission according to various embodiment of the present invention. Referring to FIG. 3, the rotation power is transmitted to the input 3 from the engine 1 and the rotation power transmitted to the input 3 is transmitted to the sun gear S of the common use planetary gear device PG1. In this case, when the ring gear R of the common use planetary gear device PG1 is braked by the friction member B, the rotation power transmitted to the sun gear S from the input 3 is transmitted to the first stage and third stage output external gear G3-2 through the carrier Cr of the common use planetary gear device PG1 and the first stage and third stage input external gear G3-1 connected to the carrier Cr.

In this case, since the first stage output external gear G1-2 is fastened with the output 5 by the linear displacement of the shift mechanism 9, the power of the engine 1 transmitted to the first stage external gear mate is shifted to the output 5 and is output, thereby implementing the 1-speed shift stage.

FIG. 4 is a schematic diagram describing a power transmission path at the time of two-stage driving in the structure of the automated manual transmission according to various embodiment of the present invention. Referring to FIG. 4, the rotation power transmitted to the input 3 from the engine 1 is transmitted to the sun gear S of the dedicated planetary gear device PG2. In this case, when the ring gear R of the dedicated planetary gear device PG2 is braked by the friction member B, the rotation power transmitted to the sun gear S from the input 3 is transmitted to the 2-speed output external gear G2-2 through the carrier Cr of the dedicated planetary gear device PG2 and the second stage input external gear G2-1 connected to the carrier Cr. Therefore, the power of the engine 1 transmitted to the second stage external gear mate is shifted to the output 5 and is output, thereby implementing the 2-speed shift stage.

FIG. 5 is a schematic diagram describing a power transmission path at the time of third stage driving in the structure of the automated manual transmission according to various embodiment of the present invention. Referring to FIG. 5, the rotation power transmitted to the input 3 from the engine 1 is transmitted to the sun gear S of the common use planetary gear device PG1. In this case, when the ring gear R of the common use planetary gear device PG1 is braked by the friction member B, the rotation power transmitted to the sun gear S from the input 3 is transmitted to the first stage and third stage output external gear G3-2 through the carrier Cr of the common use planetary gear device PG1 and the first stage and third stage input external gear G3-1 connected to the carrier Cr.

In this case, since the third stage output external gear G3-2 is fastened or connected with the output 5 by the linear displacement of the shift mechanism 9, the power of the engine 1 transmitted to the third stage external gear mate is shifted to the output 5 and is output, thereby implementing the 3-speed shift stage.

In particular, as illustrated in FIGS. 3 to 5 described above, when the shifting is performed by the 1-speed to 3-speed shift stage by using the common use planetary gear device PG1 and the dedicated planetary gear device PG2, a control is performed to almost simultaneously perform the disconnection operation of braking the ring gear R of the single planetary gear device during the shifting operation and the operation of braking the ring gear R of the single planetary gear device and the operation of the clutch C is unnecessary, thereby rapidly performing the shifting and preventing the shift quality from being reduced during the shifting.

Meanwhile, the shift mechanism 9, which is disposed between a fourth stage shift external gear mate G3 and a fifth stage shift external gear mate G4 which perform the fourth stage and fifth stage shifting, linearly moves on the output 5 to be selectively fastened with the corresponding shift output external gear, thereby implementing the fourth stage or fifth stage shift stage.

Further, the reverse shifting mechanism 19 linearly moves on the reverse idler shaft 15 to connect the reverse idler gear 17 to the reverse idler shaft 15 so as to perform the reverse stage shifting, such that the rotation power of the engine 1 transmitted to the input 3 is reversely output to the output 5, thereby implementing the reverse shifting.

According to various embodiments of the present invention, the external gear mates of the two shift stages having different shift ratios are connected to each other by sharing the one planetary gear device to reduce the number of planetary gear devices mounted to implement different shift ratios, thereby reducing the full length and weight of the transmission. Further, the automated manual transmission is configured to transmit the power of the engine transmitted to the input to the output by using the plurality of planetary gear devices, thereby reducing the shift time and preventing the torque reduction phenomenon occurring during the shifting to improve the shift quality.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automated manual transmission, comprising:
an input configured to rotate by being supplied with a rotation power from an engine;
an output disposed in parallel with the input; and
a shift gear device including:
a common use planetary gear device disposed on the input and provided with three rotation elements, a first rotation element of the three rotation elements being connected to the input; and
a plurality of pairs of external gears having different shift ratios and each pair of the external gears including a first gear disposed on the input and a second gear disposed on the output in a meshed state with the first gear at all times,
wherein at least two pairs of the plurality of the pairs of the external gears include first input external gears rotatably disposed on the input and connected to a second rotation element of the common use planetary gear device to share the second rotation element of the common use planetary gear device; and
a first friction member disposed to brake a third rotation element of the common use planetary gear device to make the common use planetary gear device transmit the rotation power from the input to the output through one of the plurality of the pairs of the external gears.

2. The automated manual transmission according to claim 1, wherein the shift gear device further includes:
a dedicated planetary gear device disposed on the input and to be rotatably provided with three rotation elements, a first rotation element of the three rotation elements of the dedicated planetary gear device being connected to the input; and
wherein one pair among the plurality of the pairs of external gears has a second input external gear and a second output external gear,
wherein the second input external gear is rotatably disposed on the input and the second output external gear is rotatably disposed on the output in a meshed state with the second input external gear at all times, and
wherein the second input external gear is connected to one of second and third rotation elements of the dedicated planetary gear device.

3. The automated manual transmission according to claim 1, wherein the common use planetary gear device is disposed between the plurality of the pairs of external gears having the different shift ratios.

4. The automated manual transmission according to claim 2, wherein in the common use planetary gear device,
the first rotation element connected to the input is a sun gear,
the second rotation element connected to the first input external gears of the at least two pairs of the plurality of the pairs of the external gears is a carrier, and
the third rotation element which is braked by the first friction member is a ring gear, and wherein in the dedicated planetary gear device,
the first rotation element connected to the input is a sun gear,
the second rotation element connected to the second input external gear is a carrier, and
the third rotation element which is braked by a second friction member is a ring gear.

5. The automated manual transmission according to claim 2, wherein each of the dedicated planetary gear device and the common use planetary gear device is a single pinion planetary gear device, respectively.

6. The automated manual transmission according to claim 2, wherein each of the dedicated planetary gear device and the common use planetary gear device is engaged to the plurality of pairs of external gears implementing a deceleration shift ratio.

7. The automated manual transmission according to claim 6, wherein in the common use planetary gear device, the first input external gears which are connected to share a carrier of the common use planetary gear device are a first stage input external gear and a third stage input external gear respectively, and
wherein in the dedicated planetary gear device, the second input external gear connected to a carrier of the dedicated planetary gear device is a second stage input external gear.

8. The automated manual transmission according to claim 1, further comprising:
a shift mechanism selectively selecting a pair of output external gears among the first output external gears and implementing a shift ratio by a linear displacement on the output to transmit the rotation power transmitted from the input to the output.

9. The automated manual transmission according to claim 8, further comprising:
a clutch configured to selectively supply the rotation power of the engine to the input,
wherein the shift mechanism selectively selecting the pair of output external gears among the first output external gears and implementing either a 1:1 shift ratio or an acceleration shift ratio by the linear displacement on the output to transmit the rotation power transmitted from the input to the output.

10. The automated manual transmission according to claim 1, further comprising:
a reverse driving gear and a reverse driven gear disposed on the input and the output respectively;
a reverse idler shaft disposed in parallel with either the input or the output;
a reverse idler gear rotatably disposed on the reverse idler shaft and in a meshed state with the reverse driving gear and the reverse driven gear; and
a reverse shift mechanism disposed to convert a state of connecting the reverse idler gear to the reverse idler shaft and a state of disconnecting the reverse idler gear from the reverse idler shaft by a linear displacement on the reverse idler shaft.

11. An automated manual transmission, comprising:
an input configured to be rotatable by being supplied with a rotation power from an engine;
an output disposed in parallel with the input; and
a shift gear device including:
a plurality of pairs of external gears, wherein each pair of the external gears include input and output external gears, each input external gear disposed on the input and each output external gear disposed on the output in a meshed state with the each input external gear at all times;
a plurality of planetary gear devices disposed on the input for producing different shift ratios and each rotatably provided with three rotation elements, a first rotation element of the three rotation elements in each planetary gear device being connected to the input and a second rotation element of the three rotation elements in the each planetary gear device being connected to at least one input external gears in the pairs of external gears, wherein the at least one input external gears are relatively rotatably disposed with respect to the input; and a friction member disposed to brake a third rotation element of the three rotation elements to make the planetary gear devices transmit the rotation power transmitted to the input at a time of a braking to the output through at least one of the plurality of pairs of external gears.

* * * * *